March 23, 1965  J. H. BEAUVAIS  3,174,232
TEACHING DEVICE
Filed Aug. 30, 1963  2 Sheets-Sheet 2
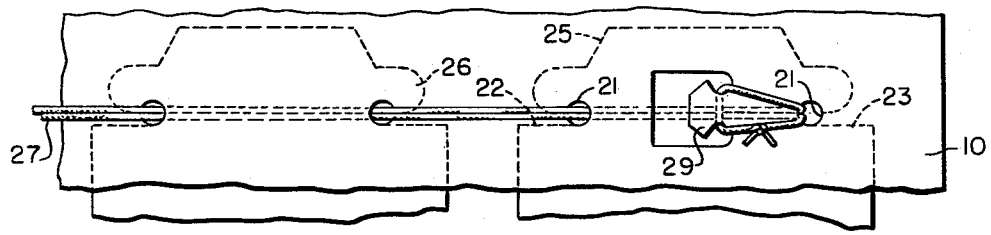
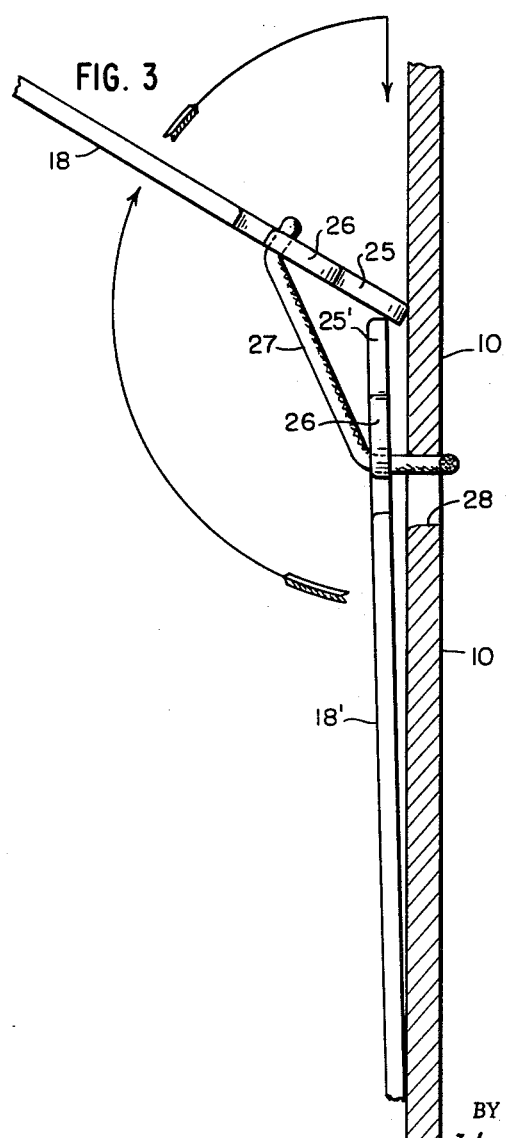
INVENTOR.
JOHN H. BEAUVAIS
BY
ATTOREYS

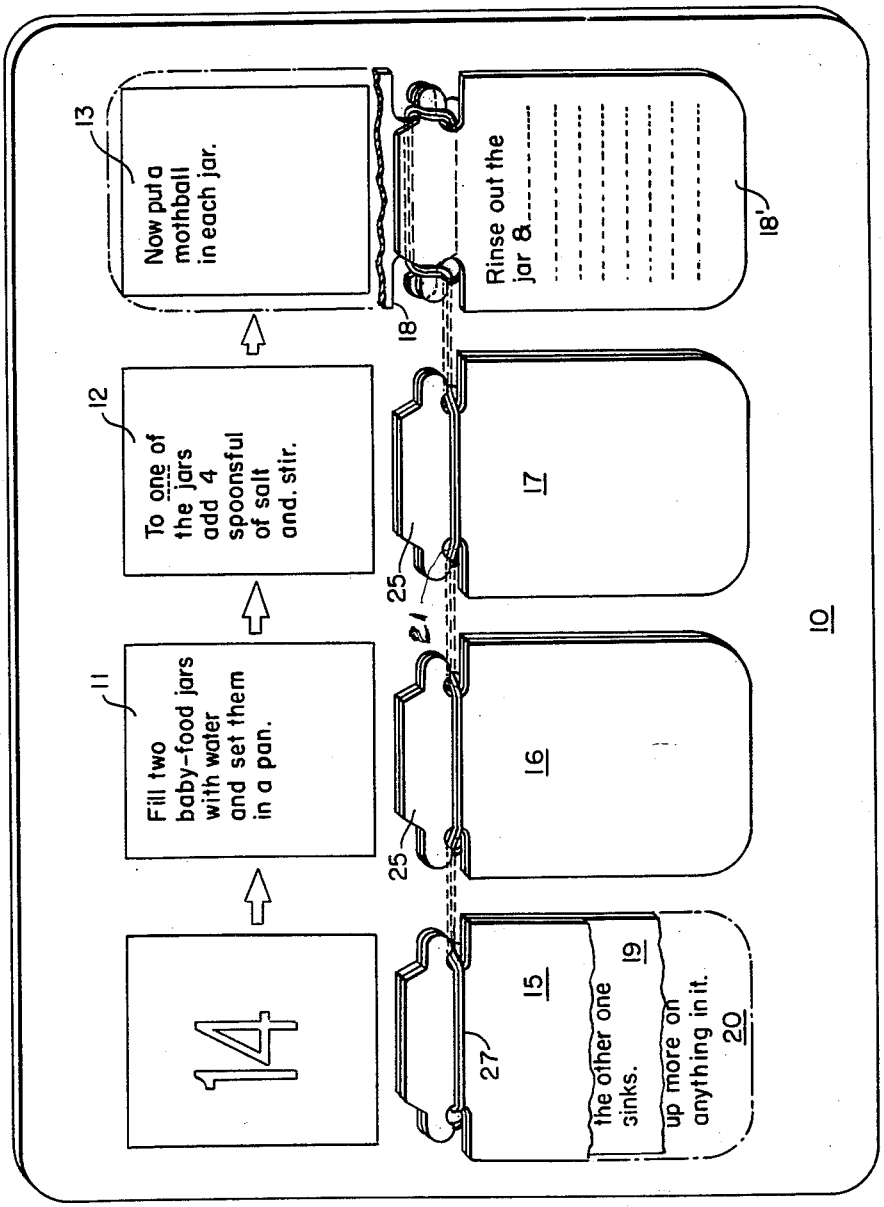

3,174,232
TEACHING DEVICE
John H. Beauvais, 20 Healey St., Cambridge, Mass.
Filed Aug. 30, 1963, Ser. No. 305,619
5 Claims. (Cl. 35—8)

This invention comprises a new and improved teaching device which has a particularly useful field in the teaching of science to young children in the lower grades.

In a preferred form the device comprises a base member of cardboard or the like having a number of areas set off thereon presenting procedural instruction for carrying out simple experiments of a scientific character, and also a series of groups each including a cover hinged at one edge or otherwise connected to the base member and enclosing a hinged intermediate sheet or leaf on which is displayed a statement of facts to be observed from following the instructions, and finally a selected area presenting an explanatory statement temporarily concealed by the intermediate leaf.

The teaching device of my invention is employed as a part of or adjunct to a pupil-operated science laboratory for elementary schools. The pupils set up the experiments as directed by the teaching device, carry them out, visually observe the results and are almost inescapably exposed to the knowledge and learning that is forcibly demonstrated to them as a result of their own manipulation.

The teaching device herein disclosed is the essential component of what may be termed a basic laboratory because its organized accountability controls and organized traffic controls enable even a non-scientific teacher without preparation to conduct a class in which each child is actually doing experiments, observing relationships and keeping an individual record of his progress. Because it teaches basic relationships of scientific phenomena common to all sciences it can be used as a curriculum by itself or to accompany any elementary science text.

Other features of the invention consist in structural details of the device which in its preferred form includes groups of cards apertured to receive elastic loops that retain the cards upon a base panel but permit each card to be selectively reversed in position or remove entirely by the teacher. Each card is provided with a locking extension or head by which it may be locked in reversed open position when it is desired to display the information originally shown beneath it.

These and other features of the invention will be best understood and appreciated from the following description of a preferred embodiment thereof selected for purposes of illustration and shown in the accompanying drawings in which—

FIG. 1 is a plan view of the device showing the cards of one group partially broken away, FIG. 2 is a fragmentary rear view, and FIG. 3 is a fragmentary sectional view on an enlarged scale.

The base panel 10 may be of cardboard, plywood or other stiff sheet material. It is shown as carrying an index number 14 and may be assumed to be one of a set of twenty-five. Upon the upper half of the panel 10 are set out three areas 11, 12 and 13 separated by open space and presenting progressive procedural instructions for one experiment. Arrows indicate the direction of progression from one area to another.

In the present instance the experiment consists in filling two jars with water, adding four teaspoons of salt to one of the jars, stirring and finally putting a moth ball in each jar.

The lower half of the panel 10 has a series of unit groups of cards with covers 15, 16, 17 and 18 each having a resilient hinged connection at its upper end to the panel. Under the cover 15 of the first unit is a hinged intermediate card 19 on which is displayed a statement of the facts to be observed from following the instructions given by the areas 11, 12 and 13. In this instance the inscription may read as follows:

> The moth ball
> in the salt
> water floats,
> the other one
> sinks

Beneath the intermediate card 19 is an area 20 on the panel presenting an explanatory statement. In this instance it may read as follows:

> Salt water is
> heavier than fresh
> water, so it pushes
> up more on
> anything in it This statement, of course, explains why the moth ball floats in salt water and sinks in fresh water.

The unit groups having the covers 16, 17 and 18 are directed to other facts that may be observed from the experiment defined in the areas 11, 12 and 13, as for example, that the salt water is milky colored because the undissolved component reflects light, or that the salt water clears as the salt dissolves, or as the undissolved salt settles to the bottom of the jar.

The individual cards may be died out of stiff sheet material, being generally rectangular and having a reduced neck in their upper portion. The neck is formed by a pair of spaced circular apertures 21 that merge into transverse slots 22–23. Above the slots 22–23 is an upwardly tapering locking projection or head 25 defined in part by rounded ears 26. The cards of each unit group are superposed in registration and held in place upon the panel by an elastic strand or band 27. For this purpose the panel 10 is punched to provide spaced apertures 28 and opposed tongues 29 over which the ends of the strand 27 are looped. Between the tongues 29 the strand is threaded in and out, passing about the reduced neck of the cards of one group, then inwardly beneath the panel and then outwardly about the cards of the next group.

The yielding connection of the cards to the panel is shown in the large scale view of FIG. 3 from which it will be apparent that when the cover 18 is turned and lifted the top edge of its head 25 acts as a fulcrum bearing against the face of the panel 10. The elastic loop 27 is stretched, the head 25′ of the intermediate card 18′ is pried outwardly and the head 25 of the cover 18 slips down behind or in front of the head 25′ of the card 18′, or as manipulated above, into locking position. The cover 18 is now held in its upright position as shown in FIG. 1 exposing the instructions that appear on the intermediate card 18′. The cover 18 may be restored to its original position by lifting and turning in the direction opposite to that indicated by the arrows in FIG. 3 and this movement is permitted by the elastic band 27.

The cover 18 may be slipped behind the second card 26 as shown in FIG. 3 or slipped in front of the second card. When this is done the heads 25 and 25′ are again superposed and the cover 18 is held in upright open position by the elastic band 27. The inner face of the cover may therefore be utilized for any statements relating to the experiment.

If preferred the explanation herein shown as being placed on the panel 10 may be placed on a removable second or third card or on the back of the cover. Since the cover and cards are readily detachable the teacher may withhold the information with respect to the experiment, thus arranging for the pupil to carry out an open end experiment of his own devising.

The detachability of the cards facilitates the substitution of one or more cards for others as the occasion arises.

The head 25 of each card is tapered to a width less than the distance between the spaced apertures 21 so that the head will slip down when reversed through the loop of the elastic strand 27.

Having thus disclosed my invention and described in detail an illustrative embodiment thereof, I claim as new and desire to secure by Letters Patent—

1. A science teaching device comprising a stiff rectangular base panel having two horizontal rows of areas individually set off therein and separated by open space, the areas of the upper row presenting to view progressive procedural instructions comprising the steps for performing a scientific experiment and the lower row of areas comprising unit groups each including a group of superposed cards, each card having a pair of spaced apertures and a locking head of less width than the card projecting upwardly above said apertures, and an elastic loop passing through the apertures of the superposed cards of each group and holding them yieldingly in place and when stretched permitting an outer card of each group to be reversed in position and locked with its head behind or in front of the head of the underlying card.

2. A teaching device as claimed in claim 1 further characterized in that several groups of cards are retained in place by a single elastic band which extends from one group to another behind the card.

3. A teaching device as claimed in claim 1 further characterized in that the spaced apertures of each card merge into transverse slots and form therewith a neck of reduced width for the reception of the elastic loop.

4. A teaching device as claimed in claim 1 further characterized in that the head of each card has a rounded ear at each end which merges into an upwardly tapering locking projection.

5. A teaching device as claimed in claim 1 further characterized in that the upper edge of the locking head is spaced above the spaced apertures of each card in position to act as a fulcrum in elongating the elastic loop which is engaged with the related card.

References Cited by the Examiner
UNITED STATES PATENTS

| | | | |
|---|---|---|---|
| 1,531,684 | 3/25 | Boix | 281—15 |
| 3,093,912 | 6/63 | Beauvais | 35—8 |

JEROME SCHNALL, *Primary Examiner.*

LAWRENCE CHARLES, *Examiner.*